United States Patent Office 3,481,233
Patented Dec. 2, 1969

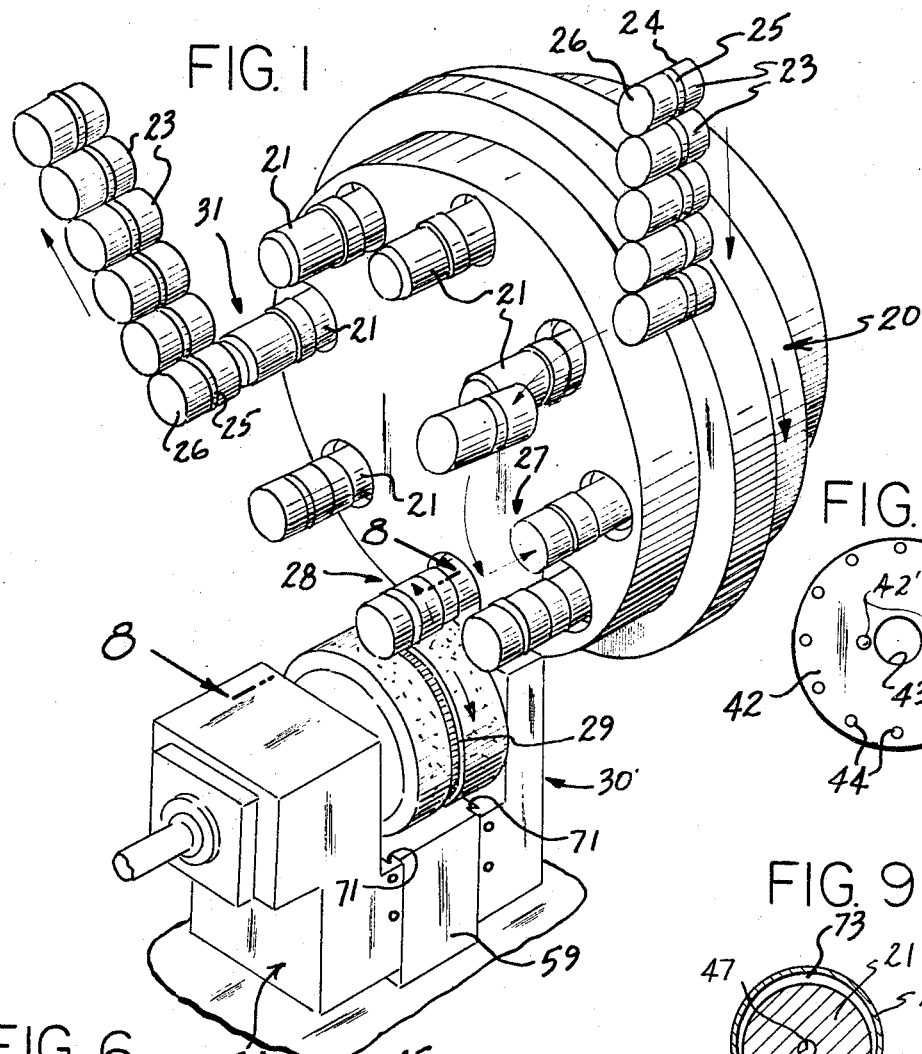
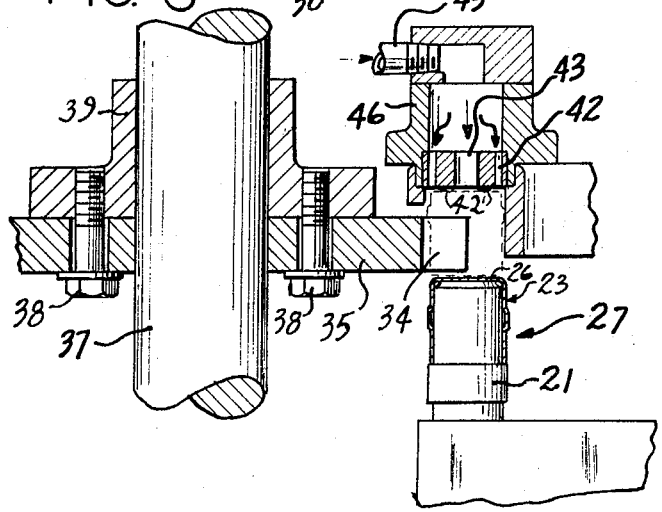
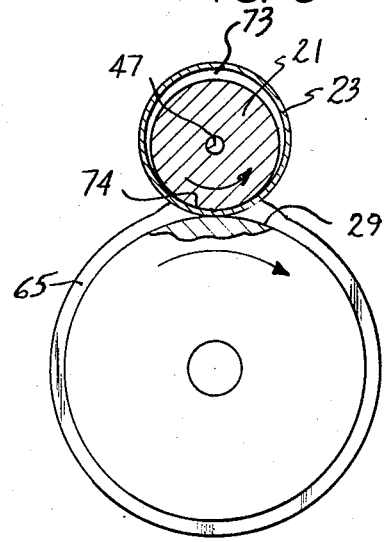

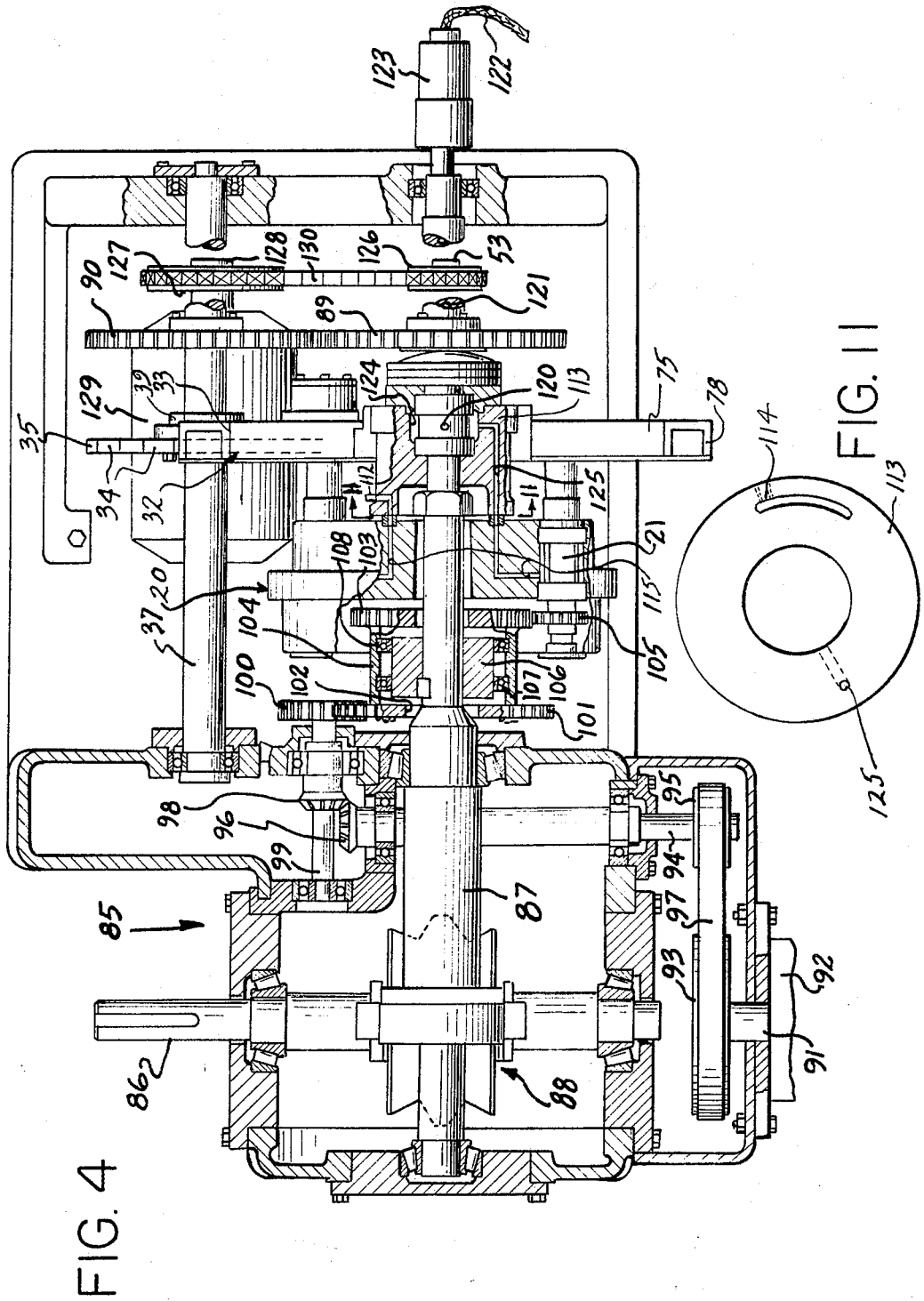

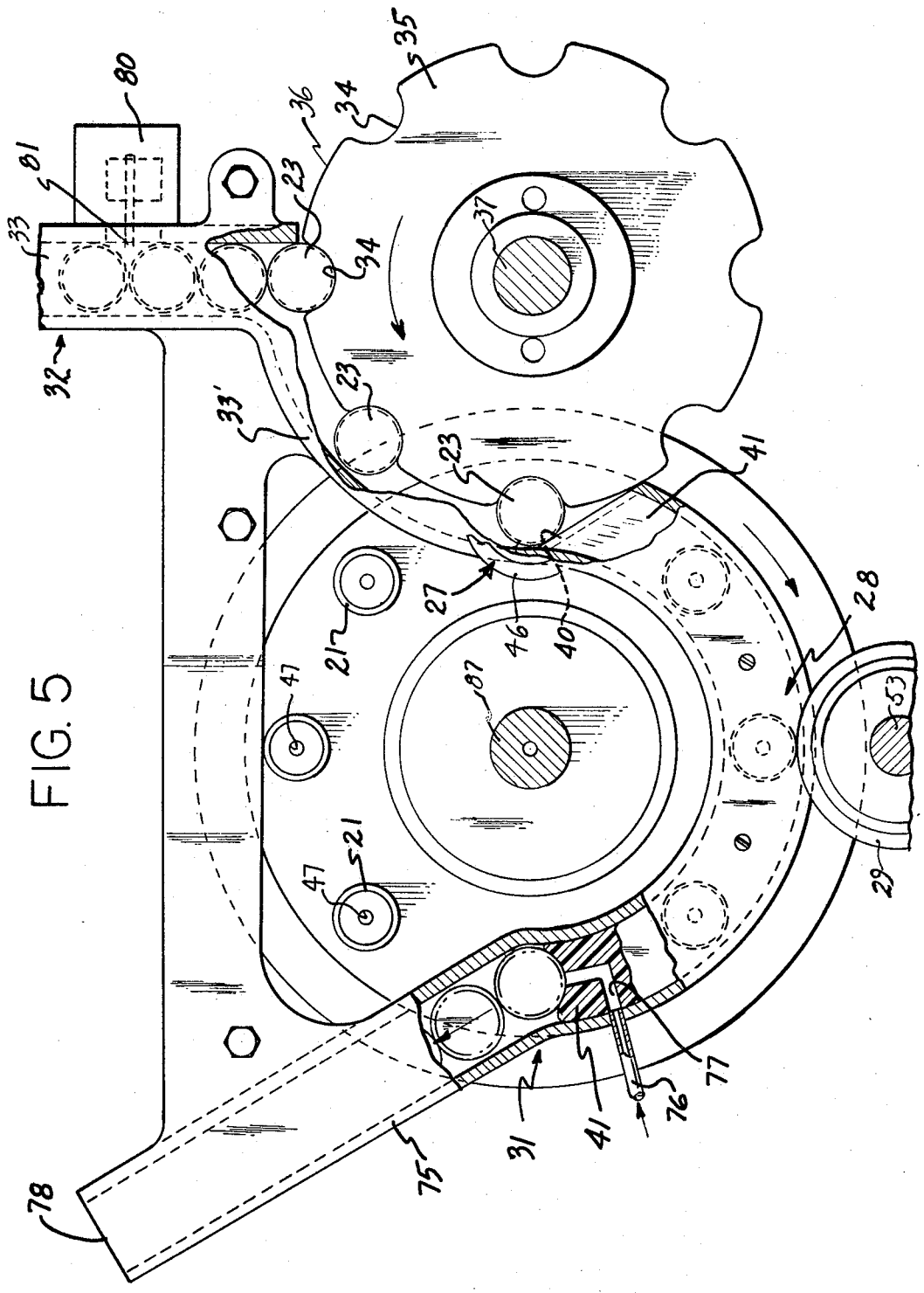

3,481,233
METHOD AND APPARATUS FOR REMOVING THE OUTER SURFACE OF AN EMBOSSMENT OF A CYLINDRICAL SKIRT OF A CAP
Carl C. Yann, Valley Station, and John W. Paskey and John F. Holzknecht, Jr., Louisville, Ky., assignors to Chemetron Corporation, Chicago, Ill., a corporation of Delaware
Filed Aug. 22, 1966, Ser. No. 574,213
Int. Cl. B23b 1/00, 5/00
U.S. Cl. 82—85                                    11 Claims

ABSTRACT OF THE DISCLOSURE

Apparatus having rotatably mounted spindles for receiving embossed cylindrical caps and cutters for removing the outer surface of the embossments from the caps.

---

This invention relates to method and apparatus for removing the outer surface of an embossment on the cylindrical skirt of a cap.

The method of the invention involves providing a plurality of spindles, advancing each spindle sequentially from a loading station at which the cap is loaded onto one of the spindles, then to a surface removing station at which the outer surface of the embossment is removed, as by shaving, and then to an unloading station where the shaved cap is removed; there are provided the steps of loading caps onto successively presented spindles at the loading station, removing the outer surface of the embossment of each successively presented cap by rotating the spindle and the outer surface of the embossment in the path of moving outer surface removing means, unloading each successively presented cap at the unloading station, and removing the unloaded caps. The advancing movement of the spindles is stopped intermittently when, simultaneously, a first spindle is at the loading station, a second spindle is at the embossment surface removing station, and a third spindle is at the unloading station. It is preferred to have the outer surface removing means move continuously in the same direction as the embossment on the skirt of the cap while the cap is being held against the spindle.

Apparatus for carrying out the method of the invention comprises, in one specific embodiment, a rotatably mounted head member carrying at least one and preferably three or more spindles. Means are provided for indexing the head and the spindles which it carries so that the spindles move sequentially from a cap loading station, to an outer surface removing station, and then to an unloading station. A nozzle is provided so that air under pressure can blow a cap onto a spindle presented at the loading station and a duct in the spindle is provided so that air under pressure can blow the cap off the spindle at the unloading station. Roll means are provided to hold the cap against the spindle at the surface removing station, while the surface removing means, which preferably takes the form of a rotary cutter, removes the outer surface of the embossment. The rotary cutter preferably rotates in a direction opposite to the direction in which the spindle and the cap which it carries rotate, so that the periphery of the embossment and the periphery of the rotary cutter move in the same direction at the location where the teeth of the rotary cuter shave the outer surface of the embossment.

In the drawings:

FIGURE 1 is a perspective view of a fragmentary portion of apparatus for carrying out the method of the invention, and shows a head member carrying spindles and a cutter assembly;

FIGURE 4 is a horizontal sectional view of the apparatus;

FIGURE 5 is an elevational view, partly in section, illustrating the path through which the caps move;

FIGURE 6 is a fragmentary sectional view showing a nozzle by which successive caps are blown onto successive spindles;

FIGURE 7 is an end view of the nozzle shown in FIGURE 6;

FIGURE 9 is an elevational view, partly in section, showing the relation of the cap to the spindle, the roll means, and the rotary cutter;

FIGURE 11 is an elevational view showing a means used in venting the spindles.

Figure 2:
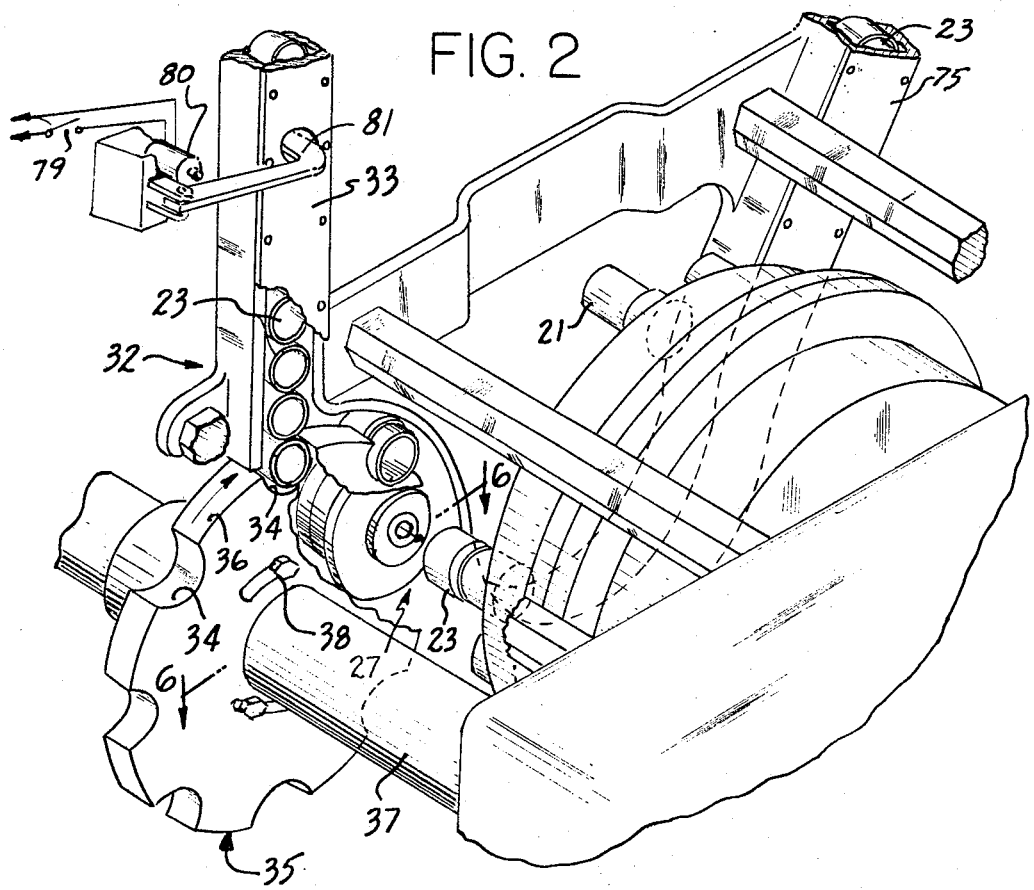
FIGURE 2 is a perspective view of apparatus, a fragmentary portion of which is shown in FIGURE 1, but showing in addition structure by which the caps are successively delivered to the loading station.

Referring now to the drawings in particular to FIGURE 1 there is shown a rotatable head member generally indicated at 20 which carries at least one and preferably a plurality of spindles 21. Although eight spindles are shown, any suitable number can be provided. Each cap 23 has a cylindrical skirt 24 with an embossment 25 and a head 26 at one end of the skirt 24. The embossments are shown to extend outwardly from the outer surface of the skirt 24. When the caps 23 are constructed for example of relatively thin metal such as aluminum, the embossments 25 can be formed directly in the skirt by suitable embossing means (not shown). The embossment 25 is shown to extend outwardly from the outer surface of each skirt 24. The caps 23 can be constructed of plastic, in which event the embossments can be formed during the molding operation. The term "embossment" is not to be considered as limiting; for example, instead of the outer surface being raised relative to the outer surface of the skirt it can be in intaglio. The term "cap" is not to be considered limited to a closure for a small-neck container, but includes cans or similar items having a tubular or cylindrical skirt or wall.

The caps 23 are delivered to a loading station generally indicated at 27 where the caps are successively loaded onto successively presented spindles 21. When the spindle or spindles are advanced, particularly, indexed, one of the spindles stops at the loading station 27, another spindle 21 and the cap 23 which it carries stop at a station 28 where the outer surface of the embossment 24 is removed by a cuter 29 of a cutter assembly generally indicated at 30, and another spindle 21 stops at an unloading station 31.

Figure 3:
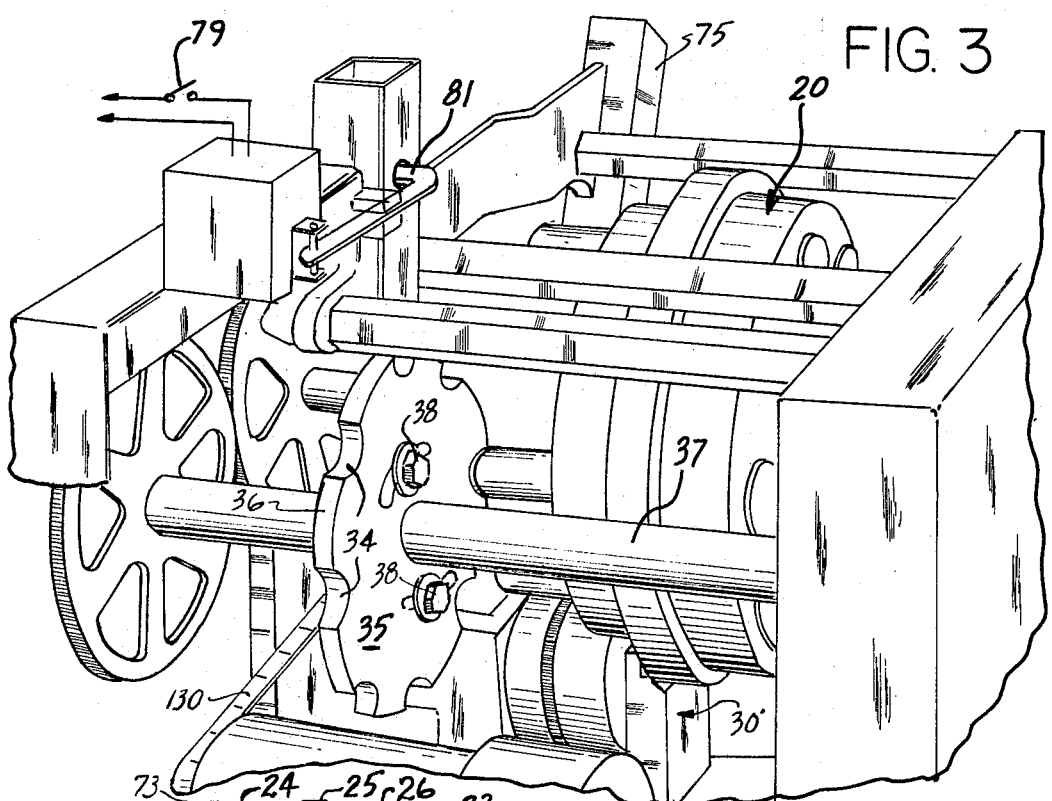
FIGURE 3 is a perspective view similar to FIGURE 2, but showing in addition the cutter assembly.

Referring now to FIGURES 2 and 3 there is shown a delivery assembly generally indicated at 32 for delivering caps successively to the loading station 27. The caps 23 are shown to pass down a chute 33. At the bottom of the chute 33 the lowermost cap 23 falls into a notch 34 of a feed star 35. As the feed star 35 turns, the next cap 23 is supported by a land 36 until the feed star 35 has rotated sufficiently for the next notch 34 to present itself below that next cap 23, and so on. The feed star 35 is adjustably connected to a drive shaft 37 by machine screws 38 which are threaded into a hub 39 (FIGURE 6) secured to the shaft 37. When the feed star 35 is adjusted relative to the shaft 37, the machine screws are tightened, and thereafter the feed star 35 and the shaft 37 rotates as a unit. The rotation of the feed star 35 is timed so that when one of the spindles 21 is at the loading station 27, the advancing movement of the head member 20 having been interrupted, a cap 23 is generally axially aligned with a spindle 21 as best shown in FIGURE 5. The chute 33 is formed integrally with a generally U-shaped section 33' which serves to prevent the caps 23 from falling out of the notches 34 as the caps approach the loading station 27. When a cap reaches the loading station 27, that cap 23 is moved into position in axial alignment with the spindle 21 at the loading station by cam action imparted by cam face 40 of an insert 41 in the section 33'. As shown for example in FIGURE 6, that cap comes to rest in general axial alignment with the spindle 21 at the loading station 27. The head 26 of the cap which has been delivered by the feed star 35 is a sort distance in front of the nozzle 42. The nozzle 42 is shown to have a central aperture 43 and a plurality of smaller apertures 44 disposed along a concentric circle relative to the aperture 43. Lugs 42' insure that the head 26 of each cap is always spaced from the ends of apertures 43 and 44. Air under pressure is supplied from a suitable source (not shown) and is directed through a conduit 45 into a manifold 46. The air under pressure passes through the apertures 43 and 44 and blows the cap onto the spindle 21. Positioning the head 26 of the cap 23 at least a short distance from the discharge ends of the apertures 43 and 44 and providing apertures 43 and 44 indicated in FIGURES 6 and 7 prevents the head 26 of the cap from being drawn against the discharge end of the nozzle 42; such would be the case if the head 26 of the cap where delivered to a position against the end of the nozzle 42 and the apertures 44 were omitted. The spindles 21 are each provided with ducts 47 which serve as vents, such vents being particularly useful when the skirts 24 are relatively long. The duct 47 which is at the loading station 27 is connected to a source of vacuum, but can be made to communicate with the atmosphere in the event the caps having short skirts are being processed.

Figure 8:
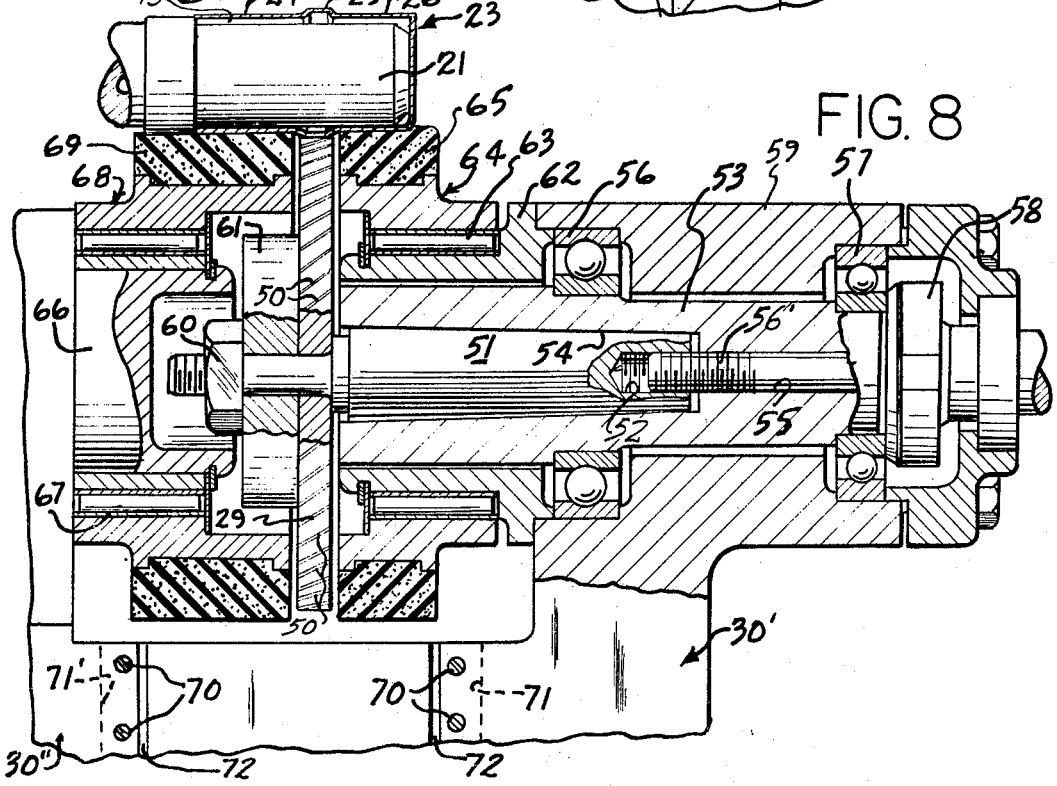
FIGURE 8 is a sectional view of the cutter assembly and showing a fragmentary portion of a spindle carrying a cap.

The cutter assembly 30 is shown in detail in FIGURE 8. The cutter 29 preferably has a great number of small cutting teeth 50. The cutter 29 is secured at its center to a tapered rod 51 having a threaded bore 52. A drive shaft 53 having a tapered central bore 54 for receiving the tapered rod 51 has a reduced drilled bore 55 for receiving a retaining bolt 56'. The threaded end of the bolt 56' is threadably received by the threaded bore 52. The drive shaft 53 is rotatably mounted by spaced apart bearings 56 and 57. A retainer 58 prevents the drive shaft 53 from shifting in frame member 59 in which bearings 56 and 57 are mounted. A nut 60 threadably received by the rod 51, passes the washer 61 against the side of the cutter 29. A bearing mount 62 is secured to the mounting block 30' adjacent the bearing 56. A needle bearing 63 rotatably mounts a roll 64. The roll carries a resilient ring 65. A stud 66 projecting from a mounting block 30" mounts a needle bearing 67. A roll 68, received about the needle bearing 67, includes a resilient ring 69, the rings 65 and 69 are composed of any suitable resilient material which preferably has a relatively high coefficient of friction, such as rubber. The rolls 64 and 68 are free wheeling. The roll 64 is driven by frictional engagement with the skirt 24 on one side of the embossment 25, and the roll 68 is driven by frictional engagement with the skirt on the other side of the embossment 25 and also by the spindle which it contacts. The outer surfaces of the rings 65 and 69 extend radially outwardly beyond the teeth 50 of the cutter 29. The mounting blocks 30' and 30" can be moved vertically to regulate the positions of the rolls 64 and 68 and the cutter 29 relative to the spindle 21 and the cap which it carries, at the outer surface removing station 28. Set screws 70 hold the mounting blocks 30' and 30" in any desired position with respect to the frame 59. Dovetail slots 71 and 71' in the mounting blocks 30' and 30" and matching members 72 and 72' of the frame 59 guide the mounting blocks 30' and 30", respectively, for vertical movement.

Each spindle 21 has an outside diameter slightly less than the inside diameter of the skirt 24 of the cap 23, to facilitate loading of the cap 23 onto the spindle 21. The rolls 64 and 68, in particular, their resilient rings 65 and 69, exert force against the skirt 24 at the portion of the skirt 74 where the rings 65 and 69 contact the outer surface of the skirt. Because of force exerted by the rings 65 and 69 and because the inside diameter of the skirt 24 is smaller than the outside diameter of the spindle 21, crescent-shaped clearance space 73, exaggerated in FIGURES 8 and 9 for the sake of clarity, exists opposite the portion 74 of the skirt 24 which contacts the spindle 21. The portion 74 of the inside surface of the skirt 24 which contacts the spindle 21 continuously changes as the spindle 21 and the cap 23 rotate as a unit. As the cutter 29 is coaxial with the rolls 64 and 68, the teeth 50 of the cutter 29 shave or shear off the outer surface of the embossment 25 at the portion 74, thus preventing damage to the cap. The cap 23 and the cutter 29 are in rotating contact for such interval of time as is required to shave outer surface of the embossment 25. During the removal of the outer surface of the embossment the head member 20 is stationary. If, as is typical, the outer surface of the skirt 24 including the embossment 25 is painted, and the embossment 25 takes the form of intelligible indicia, the outer surface of the embossment 25 is removed to expose an unpainted surface, which makes it easier to read the indicia. If, as is also typical, the cap 23 is composed of aluminum, shaving of the outer surface of the embossment 25 exposes the bright metal of which the cap is composed.

After the outer surface of the embossment 25 has been removed at the station 28, the spindle 21 carrying that cap 23 is advanced, in particular, indexed, until that spindle and its cap arrives at the unloading station 31. At the unloading station 31 the advancing movement of the head member 20 is interrupted and the cap at the unloading station 31 is removed as by passing air under pressure through the duct 47. That cap is blown into discharge chute 75. Air under pressure is passed through conduit 76, through a passageway 77 in the insert 41 and against the underside of the cap. It is preferred that the conduit 76 be connected to a source of air under continuous air pressure. The air acting against the lowermost cap in the chute 75, serves to move the caps out of the chute 75 through its discharge end 78. After the caps have been discharged from the chute 75, the caps can be transferred by suitable means (not shown) to another suitable machine or machines so that further operation, such as inserting a liner in each cap can be performed. Should a stoppage such as a jam-up or other malfunction occur in any such other machine, a switch 79 located at such other machine is closed to actuate a solenoid 80. Acutation of the solenoid 80 will cause a plunger 81 eo project to a position under a cap in the chute 33, thereby preventing any substantial number of caps from being delivered to such other machine or machines until such time as the stoppage has been alleviated.

Referring in particular to FIGURE 4, the apparatus for carrying out the method of the invention is shown to include suitable drive means generally indicated at 85 for indexing the head 20, rotating the spindles 21, and advancing the caps by means of the feed star 35 in synchronism with the indexing movements of the head member 20. The drive mechanism 85 includes a suitably journalled shaft 86 connected to an electric motor (not shown). A shaft 87 is operatively connected to the shaft 86 by a conventional indexing mechanism generally indicated at 88. The shaft 86 rotates continuously, whereas the shaft 87 rotates intermittently. The shaft 87 has preselected movement, the interval of time it rotates relative to interval of time it is stopped or stationary being preset. Secured to the shaft 87 is a gear 89 which meshes with a gear 90 secured to the shaft 37 which carries the feed star 35.

A shaft 91 connected to a gear motor 92 drives a pulley 93. A shaft 94 extending parallel to the shaft 91 carries a pulley 95 at one end and a bevel gear 96 at its other end. A belt 97 interconnects the pulleys 93 and 95. A bevel gear 98 secured to a shaft 99, meshes with the bevel gear 96. A gear 100 secured to the shaft 99 meshes with a larger gear 101. The gear 101 has an enlarged central opening 102 through which the shaft 87 extends. The gear 103, secured to the gear 101 by a hub 104, meshes with a gear 105 connected to each spindle 21; thus, the gear 103 is common to and serves as a sun gear for all the gears 105 which serve as planetary gears. An annular ring 106 secured to the shaft 87 within the hub 104. Spaced apart bearings 107 and 108 rotatably mount the hub 104. Thus, rotation of the shaft 87 has no affect upon the rotation of the hub 104, and vice versa.

Figure 10:
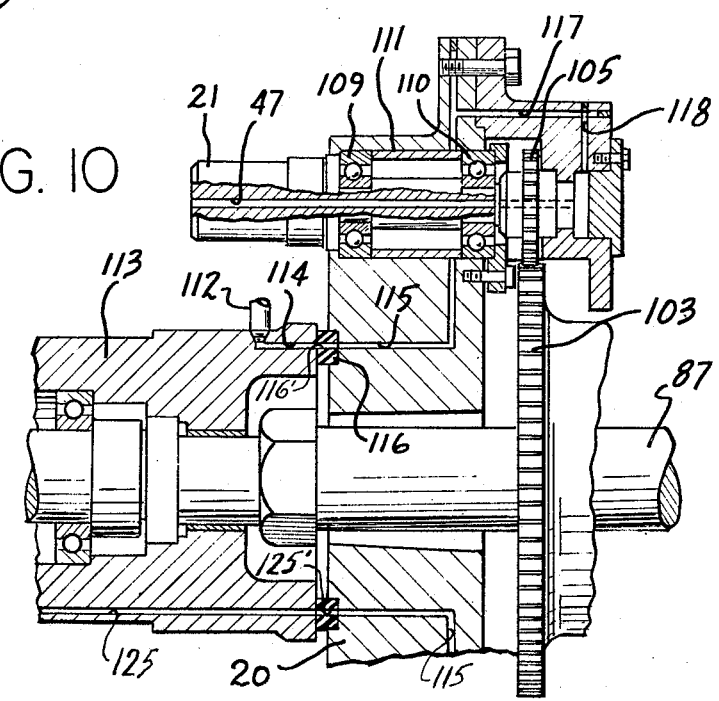
FIGURE 10 is a sectional view illustrating particularly the manner in which one of the spindles is driven and vented.

Referring in particular to FIGURE 10 where an enlarged fragmentary view of one of the spindles 21 of the shaft 87 is shown, the spindle 21 is shown to be rotatably mounted by bearings 109 and 110 spaced apart by spacer 111. It is apparent that rotation of the gear 103 will cause the shaft 105 and the spindle 21 to which it is secured to rotate. A conduit 112 connected to a source of vacuum is secured to a stationary annular member 113. The member 113 has a bore 114 which is repeatedly aligned with a bore 115 in the head member 20 as the head member 20 advances. A port 116′ in a ring 116 shown in elevation in FIGURE 11, causes selective communication between the bores 114 and 115 to cause vacuum to exist in the bore 115 and in communicating bores 117, 118 and 47. Such communication is provided only when a spindle 21 is disposed at the loading station 27. As each successive spindle is advanced to the loading station, vacuum exists in an identical set of bores including a bore 47 in that next successive spindle to suck the next successive cap onto its spindle.

The shaft 87 contains a bore 120 which communicates with a bore 121. A conduit 122, connected to a source of air under pressure, is connected to one end of the shaft 87 by a swivel connection 123. The swivel connection 123 provides continuous communication between the conduit 122 and the bore 121. The bore 120 communicates with an annular recess 124 which in turn communicates with a bore 125. The bore 125 communicates with a port 125′ and the bore 115 of the spindle which is at the unloading station so that as the cap is unloaded from that spindle by a blast of air acting against the head 26 of that cap.

As best shown in FIGURE 4 the cutter drive shaft 53 has a sprocket 126 secured to it. A sprocket 127 connected to a drive shaft 128 of an electric motor 129 is connected to the sprocket 126 by an endless chain 130. As is preferred the drive shaft 86, the shaft 91 and the shaft 128 are driven independently of each other. If desired the shaft 91 and the gear motor 92 can be omitted and the pulley 93 can be mounted on an extension (not shown) of the shaft 86, thus the shaft 86 would drive both the shaft 87 and the shaft 94.

In operation, assuming there are caps in the chute 33, and that the shafts 86, 91 and 128 are being driven by their respective motors, the feed star 35 operates intermittently to advance caps 23 intermittently to the loading station 27. A cap 23 arrives at the loading station 27 at the same time as one of the spindles 21 stops at the loading station 27, so that the cap is generally axially aligned with that spindle. As viewed in FIGURE 5, the spindle 21 which is immediately ahead of the spindle 21 at the loading station 27, is between the loading station 27 and station 28. While the indexing head 20 is stationary and while the one spindle 21 is at the loading station, another spindle 21 carrying a cap 23 is at the station 28 having its outer surface of its embossment 25 removed by the cutter 29. Simultaneously with the loading one cap at the loading station 27, the removal of the outer surface of the embossment 25 on a cap at the station 28, a completed cap is being unloaded at the loading station 31 by a blast of air passing outwardly through the duct 47. As soon as that cap encounters the blast of air under pressure passing through the bore 77, that cap and the other caps ahead of it are pushed up the discharge chute 75. As viewed in FIGURE 5, the spindles between the unloading station and the loading station are empty of caps as they travel in a clockwise direction. The spindles 21 are all, however, in continuous rotation. The continuous rotation of the spindles 21 not only facilitates loading and unloading of the caps at respective stations 27 and 31 but also aids in the removal of the outer surface of the embossment 25 at the station 28.

By way of illustration, not limitation, each spindle 21 has an outside diameter of 1.132 inches and rotates at 962 r.p.m.; the cutter 29 has an outside diameter of 3.5 inches and rotates at 6050 r.p.m.; the cutter 29 has 180 teeth 50.

Other embodiments and modifications of this invention will suggest themselves to those skilled in the art, and all such of these as come within the spirit of this invention are included within its scope as best defined by the appended claims.

We claim:

1. Apparatus for removing the outer surface of an embossment on a cylindrical skirt of a cap, comprising: a rotatably mounted spindle adapted to receive a cap, the diameter of said spindle being small enough to provide clearance space between the outside surface of said spindle and the inside surface of the skirt, rotatably mounted resilient roll means adjacent said spindle and frictionally engageable with the outside surface of the skirt for urging a continuously changing portion of the inside surface of the skirt against said spindle as said spindle rotates, and means in alignment with the embossment for removing the outer surface of the embossment at that portion of the skirt as said spindle and said roll means rotate.

2. Apparatus as claimed in claim 1, wherein said outer surface removing means includes a rotary cutter, and said roll means comprises a resilient roll member on each side of said rotary cutter and engageable with the cap during surface removal to urge the cap against the spindle.

3. Apparatus as claimed in claim 1, wherein said outer surface removing means includes a rotary member, and means for driving said spindle and said rotary member in opposite directions so that the periphery of the embossment and the periphery of the rotary member move in the same direction at the location where said rotary member removes the outer surface of the embossment.

4. Apparatus as claimed in claim 1, including means for moving the outer surface removing means at a substantially higher peripheral speed than the peripheral speed of the embossment.

5. Apparatus for removing the outer surface of an embossment on a cylindrical skirt of a cap, comprising: a rotatably mounted head member, a plurality of rotatably mounted spindles carried by said head member at spaced apart locations, each of said spindles being adapted to receive one of said caps, means for rotating said spindles, means for removing the outer surfaces of the embossments on the cylindrical skirts of successive caps on successive spindles, means for indexing said head member and said spindles to bring successive caps on successive spindles into the path of said outer surface removing mean, rotatably mounted resilient roll means adjacent the successive spindles and frictionably engageable with the outside surfaces of the skirts of the successive caps in said path for urging continuously changing portions of the inside surfaces of the skirts of said caps against said spindles as said spindles rotate, and means for automatically loading said caps onto said spindles, and for automatically unloading caps the outer surfaces of the embossments of which have been removed.

6. Apparatus as claimed in claim 5, wherein said embossment surface removing means includes a rotary cutter, and said roll means comprises a resilient roll member on each side of said rotary cutter and engageable with the cap during surface removal to urge the cap against the spindle.

7. Apparatus as claimed in claim 1, including means mounting said roll means for free-wheeling rotation, at least a portion of said roll means contacting said spindle, said roll means being driven by both said spindle and the cap.

8. Apparatus as claimed in claim 1, including means for mounting said roll means and outer surface removing means for positional adjustment relative to the embossment of the cap on said spindle.

9. Apparatus as claimed in claim 1, wherein the cap has a head at one end of said skirt, said apparatus further comprising means for moving said spindle and the cap which is carries relatively into and out of the path of said rotary member, means for delivering a cap to a loading station in generally axial alignment with said spindle, and nozzle means disposed adjacent, but spaced from, the head of the cap for directing air against the head of the cap to blow the cap onto the spindle, said nozzle having means for preventing the cap from being drawn against the nozzle as air passes through said nozzle.

10. Apparatus as claimed in claim 9, wherein said preventing means includes a plate having an aperture for directing air against the head of the cap at its axis and apertures spaced about said first-mentioned aperture for directing air at the periphery of the head of the cap.

11. Apparatus as claimed in claim 9, said spindle having means for venting said spindle to facilitate loading of the cap onto said spindle.

References Cited

UNITED STATES PATENTS

| | | | |
|---|---|---|---|
| 1,981,260 | 11/1934 | Yager | 90—20 |
| 2,298,366 | 10/1942 | Gladfelter | 82—101 X |
| 2,701,015 | 2/1955 | Gottschalk | 82—102 X |
| 3,129,621 | 4/1964 | Makowski | 82—59 |
| 3,230,804 | 1/1966 | Pezzoli | 82—85 |
| 3,270,620 | 9/1966 | Wegner | 90—15 |
| 3,302,500 | 2/1967 | Hackenberger | 82—101 X |

FOREIGN PATENTS 148,218   12/1962   U.S.S.R.

HARRISON L. HINSON, Primary Examiner

U.S. Cl. X.R.

82—101; 90—20, 15